United States Patent
Honjo et al.

(10) Patent No.: US 9,101,882 B2
(45) Date of Patent: Aug. 11, 2015

(54) WET TYPE FLUE-GAS DESULFURIZATION APPARATUS AND METHOD FOR ADJUSTING OXIDATION REDUCTION POTENTIAL OF ABSORBENT THEREFOR

(71) Applicant: MITSUBISHI HEAVY INDUSTRIES, LTD., Tokyo (JP)

(72) Inventors: Shintaro Honjo, New York, NY (US); Toshihiro Fukuda, Tokyo (JP); Seiji Kagawa, Tokyo (JP); Naoyuki Kamiyama, Tokyo (JP); Satoru Sugita, New York, NY (US); Norikazu Inaba, New York, NY (US); Motofumi Ito, New York, NY (US); Jun Hashimoto, New York, NY (US)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 83 days.

(21) Appl. No.: 14/085,967

(22) Filed: Nov. 21, 2013

(65) Prior Publication Data

US 2015/0139881 A1    May 21, 2015

(51) Int. Cl.
  *B01D 53/50*  (2006.01)
  *B01D 53/77*  (2006.01)
  *B01D 53/96*  (2006.01)
  *B01D 53/78*  (2006.01)

(52) U.S. Cl.
  CPC .............. *B01D 53/96* (2013.01); *B01D 53/504* (2013.01); *B01D 53/78* (2013.01)

(58) Field of Classification Search
  CPC .. B01D 53/1412; B01D 53/50; B01D 53/501; B01D 53/77; B01D 53/78; B01D 53/1481
  See application file for complete search history.

(56) References Cited

U.S. PATENT DOCUMENTS 5,080,696 A *   1/1992   Marchand et al. .............. 95/187
8,741,033 B2 *  6/2014   Kagawa et al. ................ 96/235

FOREIGN PATENT DOCUMENTS

JP        10-202050 A       8/1998
JP         3836048 B2      10/2006
WO    WO 2012176635 A1 *  12/2012 ............ B01D 53/64

* cited by examiner

*Primary Examiner* — Timothy Vanoy
(74) *Attorney, Agent, or Firm* — Westerman, Hattori, Daniels & Adrian, LLP

(57) ABSTRACT

A wet type flue-gas desulfurization apparatus includes a desulfurization apparatus main body; a gas introducing unit that is disposed on a side wall of the desulfurization apparatus main body and that introduces a flue gas; an absorbent accumulating unit that accumulates an absorbent which has absorbed the sulfur oxide present in the flue gas; a circulation line that circulates the absorbent from the absorbent circulating unit; a spray pipe that is disposed in the vicinity of the middle portion of the desulfurization apparatus main body and that sprays the absorbent, which is circulated in the circulation line, as a spray liquid from a nozzle; an ORP meter that measures the oxidation reduction potential of the absorbent; and an oxidation resistant pipe group that, in the vicinity of the interface of the absorbent present in the absorbent accumulating unit, cushions a falling liquid falling from an absorber of the absorbent.

7 Claims, 5 Drawing Sheets

WET TYPE FLUE-GAS DESULFURIZATION APPARATUS AND METHOD FOR ADJUSTING OXIDATION REDUCTION POTENTIAL OF ABSORBENT THEREFOR

BACKGROUND OF THE INVENTION

1. Field of the Invention

The present invention relates to a wet type flue-gas desulfurization apparatus and a method for adjusting the oxidation reduction potential of an absorbent in the wet type flue-gas desulfurization apparatus.

2. Description of the Related Art

Regarding a flue-gas desulfurization apparatus that removes the sulfur oxide present in the flue gas which is generated as a result of burning fuel oil or coal in a thermal power station; a wet type flue-gas desulfurization apparatus is widely prevalent in which the flue gas and an absorbent slurry (formed of a calcium compound such as limestone) are placed in contact with each other in an absorber so that the sulfur oxide present in the flue gas is absorbed in the absorbent slurry, and the post-contact absorbent slurry is oxidized and subjected to solid-liquid separation to produce gypsum as a by-product.

In this case, the sulfur dioxide that is the principal sulfur oxide present in the flue gas is absorbed in the absorbent according to the reaction formulae given below, and reacts with the oxygen present in the flue gas or the oxygen supplied from outside to produce gypsum.

$$SO_2 + H_2O \rightarrow H^+ + HSO_3^- \qquad (1)$$

$$H^+ + HSO_3^- + \tfrac{1}{2}O_2 \rightarrow 2H^+ + SO_4^{2-} \qquad (2)$$

$$2H^+ + CaCO_3 + SO_4^{2-} \rightarrow CaSO_4 + CO_2 + H_2O \qquad (3)$$

In such a wet type flue-gas desulfurization apparatus, the oxidation reduction potential (ORP) of the absorbent is controlled using the oxidation air volume. Hence, in an absorbent accumulating unit, normal air (oxygen) is supplied and the oxidation air volume is adjusted.

However, for example, depending on the boiler combustion state, there are times when the oxygen ($O_2$) in the flue gas increases in concentration than the expected level or when the sulfur oxide ($SO_2$) decreases in concentration than the expected level. In such cases, even if the oxidation air volume that is introduced in the absorbent accumulating unit of the desulfurization apparatus is reduced to zero, the natural oxidation occurring due to the contact between the flue gas and the absorbent present inside the absorber leads to substantial oxidation of the sulfurous acid that is produced as a result of absorbing of the sulfur oxide. Besides, the absorbent falls in a peroxidative state. As a result, it becomes not possible to control the ORP at a desired level. For example, consider a case in which the design is meant to control the desired ORP value at 100 mV but the ORP value unstably hovers at an extremely high value such as a value between 200 mV to 1000 mV thereby leading to excessive oxidation. In that case, for example, manganese oxide is produced thereby leading to issues such as gypsum coloration, pH meter malfunctioning due to scaling, nozzle blockage, and gypsum dehydrator clogging. Moreover, the selenium present in the absorbent changes from the quadrivalent state to the hexavalent state, thereby making its removal difficult. Furthermore, the effluent treatment standards cannot be maintained due to the purification of persulfuric acid, thereby making separate after-treatment necessary.

In that regard, conventionally, there has been a proposal to measure the oxidation reduction potential of the absorbent using an ORP meter; to adjust the supply of a gas containing oxygen according to the oxidation reduction potential; and, if the oxidation reduction potential increases to exceed the adjustable range of supplying the gas containing oxygen, to supply an oxidation inhibitor to the absorbent with the aim of adjusting the oxidation reduction potential (Patent Literature 1, Japanese Laid-open Patent Publication No. 2003-340238).

However, in the case of supplying an oxidation inhibitor as proposed in Patent Literature 1, it is difficult to control the dosage of the oxidation inhibitor. That is because, every time the oxidation inhibitor is added, although there is a decrease in the electric potential of the ORP, the addition conditions change every time in a subtle way depending on the boiler combustion conditions and the oxygen concentration conditions in the flue gas. Besides, once the oxidation inhibitor is added, the ORP value undergoes a drastic change, thereby making it difficult to control the ORP value at the desired value.

In that regard, there has been a demand for a wet type flue-gas desulfurization apparatus in which, for example, even if the oxidation air volume supplied in the absorbent accumulating unit is reduced to zero, the ORP can be controlled at the set ORP value as desired.

SUMMARY OF THE INVENTION

According to an aspect of the present invention, a wet type flue-gas desulfurization apparatus includes a desulfurization apparatus main body; a gas introducing unit that is disposed on a side wall of the desulfurization apparatus main body and that introduces a flue gas; an absorbent accumulating unit that accumulates an absorbent which has absorbed the sulfur oxide present in the flue gas; a circulation line that circulates the absorbent from the absorbent circulating unit; a spraying unit that is disposed in the vicinity of the middle portion of the desulfurization apparatus main body and that sprays the absorbent, which is supplied in the circulation line, as a spray liquid from a nozzle; an ORP meter that measures the oxidation reduction potential of the absorbent; and a falling-liquid cushioning material that is disposed in the vicinity of the interface of the absorbent present in the absorbent accumulating unit and that cushions a falling liquid falling from an absorber of the absorbent.

According to another aspect of the present invention, a wet type flue-gas desulfurization apparatus is used to control the natural oxidation occurring due to a contact between a flue gas of the absorbent and the absorbent, and, when it is determined that an ORP value of the absorbent is equal to or greater than a desired value, to supply either the pH adjuster or the oxidation inhibitor or both.

DETAILED DESCRIPTION OF THE PREFERRED EMBODIMENTS

Exemplary embodiments of the present invention are described in detail below with reference to the accompanying drawings. However, the present invention is not limited to the exemplary embodiments. Moreover, the constituent elements specified in the embodiments are to be construed as embodying all modifications and alternative constructions that may occur to one skilled in the art that fairly fall within the basic teaching herein set forth. Furthermore, the constituent elements specified in the embodiments can be combined together in an appropriate manner.

It is an object of the embodiments of the present invention to provide, for example, a wet type flue-gas desulfurization apparatus and a method for adjusting the oxidation reduction potential of an absorbent in the wet type flue-gas desulfurization apparatus so that, even if the oxidation air volume supplied in an absorbent accumulating unit is reduced to zero, the ORP can be controlled at the set ORP value as desired.

According to the embodiments of the present invention, a falling-liquid cushioning material is used in the vicinity of the interface of the absorbent in the absorbent accumulating unit for the purpose of cushioning a falling liquid that falls down from the absorber. As a result, for example, in the case in which, even if the oxidation air volume that is introduced in the absorbent accumulating unit is reduced to zero, the natural oxidation occurring due to the contact between the flue gas and the absorbent leads to substantial oxidation of the sulfurous acid and the absorbent falls in a peroxidative state; the falling liquid does not fall down like a waterfall directly on the liquid level, thereby preventing entrainment of the gas in the absorbent accumulated in the absorbent accumulating unit. With that, it becomes possible to curb excessive oxidation reaction and to control the set ORP value as desired.

First Embodiment

Figure 1:
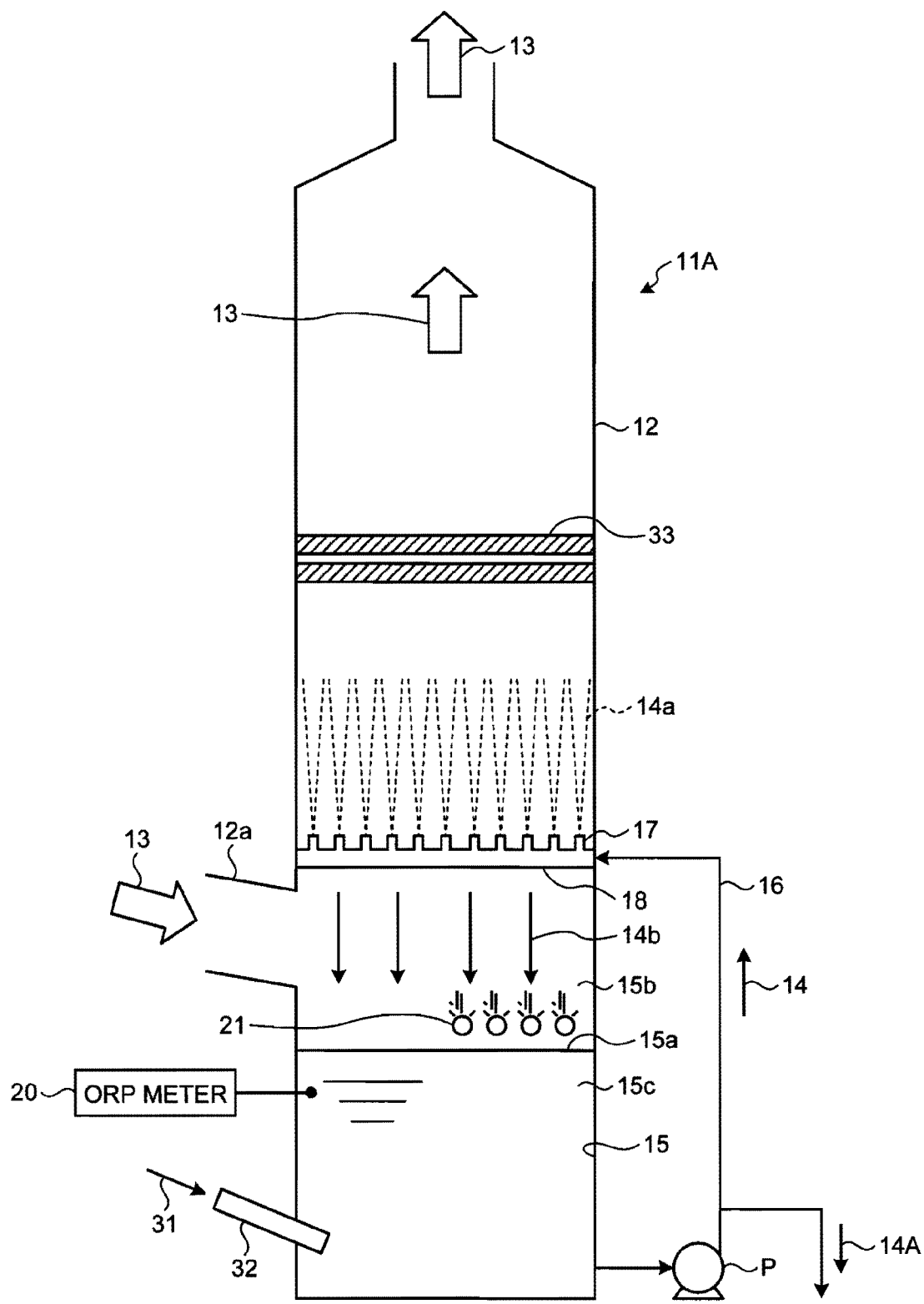
FIG. 1 is an outline drawing illustrating a wet type flue-gas desulfurization apparatus according to a first embodiment.

A wet type flue-gas desulfurization apparatus according to a first embodiment of the present invention is explained below with reference to an accompanying drawing. FIG. 1 is an outline drawing illustrating the wet type flue-gas desulfurization apparatus according to the first embodiment. As illustrated in FIG. 1, a wet type flue-gas desulfurization apparatus according to the first embodiment (hereinafter, called "desulfurization apparatus") 11A includes a desulfurization apparatus main body 12; includes a gas introducing unit 12a that is disposed on a side wall of the desulfurization apparatus main body 12 and that introduces a flue gas 13; an absorbent accumulating unit 15 that accumulates an absorbent 14 which has absorbed the sulfur oxide present in the flue gas 13; a circulation line 16 that circulates the absorbent 14 from the absorbent accumulating unit 15; a spray pipe 18 that is disposed in the vicinity of the middle portion of the desulfurization apparatus main body 12 and that functions as a spraying unit for dropping the absorbent 14, which is supplied in the circulation line 16, as a spray liquid 14a while spraying it in the upward direction via a spray nozzle 17; an ORP (oxidation reduction potential) meter 20 that measures the oxidation reduction potential of the absorbent 14; and an oxidation resistant pipe group 21 that represents a falling-liquid cushioning material for cushioning a falling liquid 14b that falls down from the absorber of the absorbent 14 in the vicinity of the interface of the absorbent 14 (i.e., over the liquid level, on the surface of the liquid level, or across the interface space portion and the liquid portion of the liquid level) in the absorbent accumulating unit 15.

With reference to FIG. 1, a reference numeral P represents a pump that is disposed in the circulation line 16 and that sends the absorbent 14; a reference numeral 31 represents oxidized air; a reference numeral 32 represents an air supplying tube; and a reference numeral 33 represents a demister that removes the mist from the flue gas 13.

In the first embodiment, the oxidation resistant pipe group 21 is installed inside an interface space portion 15b on the upper surface side of a liquid level 15a in the absorbent accumulating unit 15.

Herein, it is desirable that the oxidation resistant pipe group 21 is formed to be abrasion-resistant in nature by, for example, performing aluminum coating on, for example, the surface of FRP (Fiber Reinforced Plastic).

The pipe diameter can be around, for example, 3 cm to 10 cm.

Since the oxidation resistant pipe group 21 is disposed; the falling liquid 14b, which falls down when a spray liquid 14a that is sprayed from the spray nozzle 17 of the spray pipe 18 reverses the course, is prevented from directly running into the liquid level 15a. Hence, there is a reduction in the entrainment of the gas which occurs in the absorbent accumulated in the absorbent accumulating unit due to what is called the waterfall effect in which the falling liquid 14b directly falls down and heavily runs into the liquid level 15a.

As a result, the oxygen entrainment amount in the gas decreases, thereby leading to a decrease in the oxidization.

The oxidation resistant pipe group 21 can be disposed in plurality in parallel to each other or can be disposed in plurality in a reticular pattern.

At that time, if the height of the liquid level 15a in the absorbent accumulating unit 15 is adjusted in the vertical direction, it becomes possible to change the degree of exposure of the oxidation resistant pipe group 21. By adjusting the degree of exposure, the extent of oxidation in the absorbent accumulating unit 15 can be adjusted by means of liquid-level control.

As far as the method of controlling the height of the liquid level 15a is concerned; for example, it is possible to adjust the amount of extraction of an extraction liquid 14A of the absorbent 14 or, at the time of newly supplying the absorbent, it is possible to increase the concentration of the gypsum slurry so as to reduce the absorbent volume. Alternatively, the oxidation resistant pipe group 21 can be configured to include an adjusting unit for adjusting the height of the oxidation resistant pipe group 21 and making it installable in a vertically adjustable manner.

In this way, for example, in the case in which the absorbent falls in a peroxidative state even if the oxidation air volume that is introduced in the absorbent accumulating unit 15 is reduced to zero; the falling liquid 14b does not directly make contact with the liquid level 15a because of the oxidation resistant pipe group 21 serving as a falling-liquid cushioning material which is disposed inside the interface space portion 15b on the upper surface side of the liquid level 15a in the absorbent accumulating unit 15 and which cushions the falling liquid 14b. With that, it becomes possible to reduce the waterfall effect occurring due to the falling liquid 14b, to prevent entrainment of the gas in the absorbent accumulated in the absorbent accumulating unit, and to control the ORP at the set ORP value as desired.

Herein, even if the oxidation air volume that is introduced in the absorbent accumulating unit 15 is reduced to zero, the absorbent falls in a peroxidative state under following possible conditions. For example, the absorbent falls in a peroxidative state when the flue gas conditions vary according to the boiler consumption state and when the oxygen ($O_2$) concentration in the flue gas increases to a greater level than expected; or when a fuel containing a smaller amount of S (sulfur) than the planned amount is burnt thereby resulting in a lower concentration of sulfur oxide ($SO_x$) in the flue gas and a reduction in the requisite oxidation amount of sulfur oxide; or when the organic matter (such as fatty acids or phthalic acids) mixed in the coal causes a substantial increase in the foamability of the absorbent 14.

Herein, whether or not the absorbent 14 has fallen in the peroxidative state is monitored according to points 1) to 3) given below.

1) The ORP meter 20 measures the ORP value of the absorbent 14. For example, if the target ORP value is set to 100 mV but if the ORP value exceeds the desired value of 100 mV and is, for example, between 200 mV to 1000 mV; then it is determined that the absorbent 14 has fallen in the peroxidative state.

2) The degree of coloration of the gypsum slurry is confirmed. When the absorbent 14 that is circulating in the circulation line 16 is extracted, the degree of coloration is determined either visually or using a color meter.

If the gypsum is colored to black or brown, it is possible to think that there is formation of manganese oxide. Thus, it is determined that the absorbent 14 has fallen in the peroxidative state.

3) The degree of coloration of the dewatered gypsum is confirmed. Some portion of the absorbent 14 is extracted as the extraction liquid 14A; and, for example, after dewatering the extraction liquid 14A, the degree of coloration is determined either visually or using a color meter.

If the gypsum is colored to black or brown, it is possible to think that there is formation of manganese oxide. Thus, it is determined that the absorbent 14 has fallen in the peroxidative state.

Second Embodiment

Figure 2:
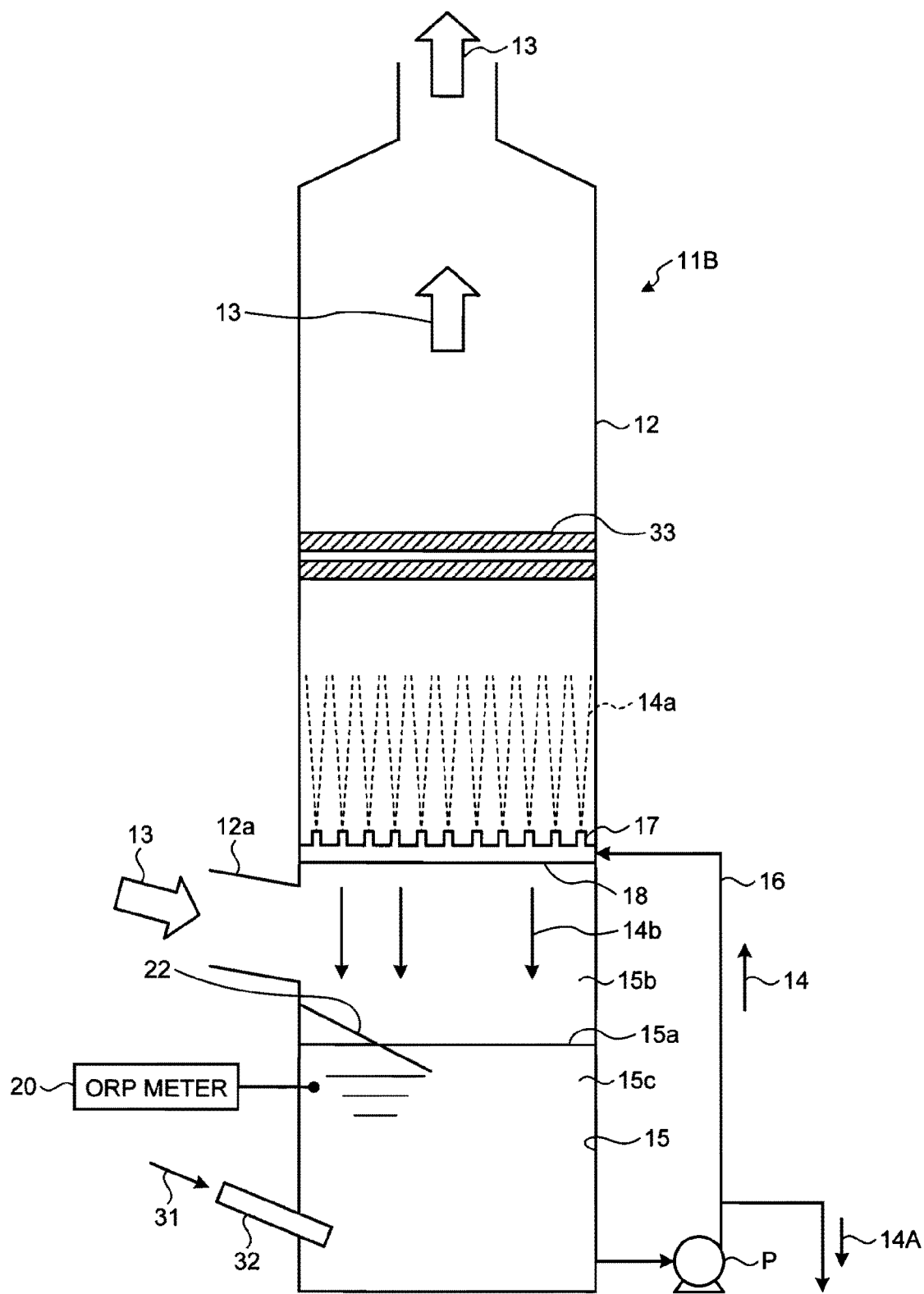
FIG. 2 is an outline drawing illustrating a wet type flue-gas desulfurization apparatus according to a second embodiment.

A wet type flue-gas desulfurization apparatus according to a second embodiment of the present invention is explained below with reference to an accompanying drawing. FIG. 2 is an outline drawing illustrating the wet type flue-gas desulfurization apparatus according to the second embodiment. Herein, the constituent elements identical to the constituent elements described in the first embodiment are referred to by the same reference numerals, and the explanation thereof is not repeated.

As illustrated in FIG. 2, a desulfurization apparatus 11B includes an oxidation resistant plate 22 that functions as a falling-liquid cushioning material in place of the oxidation resistant pipe group 21 according to the first embodiment.

In the second embodiment, the oxidation resistant plate 22 is installed across the inside of the interface space portion 15b, which is on the upper surface side of the liquid level 15a in the absorbent accumulating unit 15, and a lower portion 15c of the liquid level 15a.

As a result, the falling liquid 14b, which falls down when the spray liquid 14a sprayed from the spray nozzle 17 of the spray pipe 18 reverses the course, falls on the oxidation resistant plate 22. That cushions the shock of the falling liquid 14b directly running into the liquid level 15a. Hence, there is a reduction in the entrainment of the gas which occurs in the absorbent accumulated in the absorbent accumulating unit due to the waterfall effect in which the falling liquid 14b directly falls down.

Meanwhile, the oxidation resistant plate 22 can be a tabular plate or a wavelike plate.

Moreover, it is also possible to have a slit or a small hole on the plate.

Besides, as described earlier, if the height of the liquid level 15a is adjusted in the vertical direction, it becomes possible to change the degree of exposure of the oxidation resistant plate 22.

Third Embodiment

Figure 3:
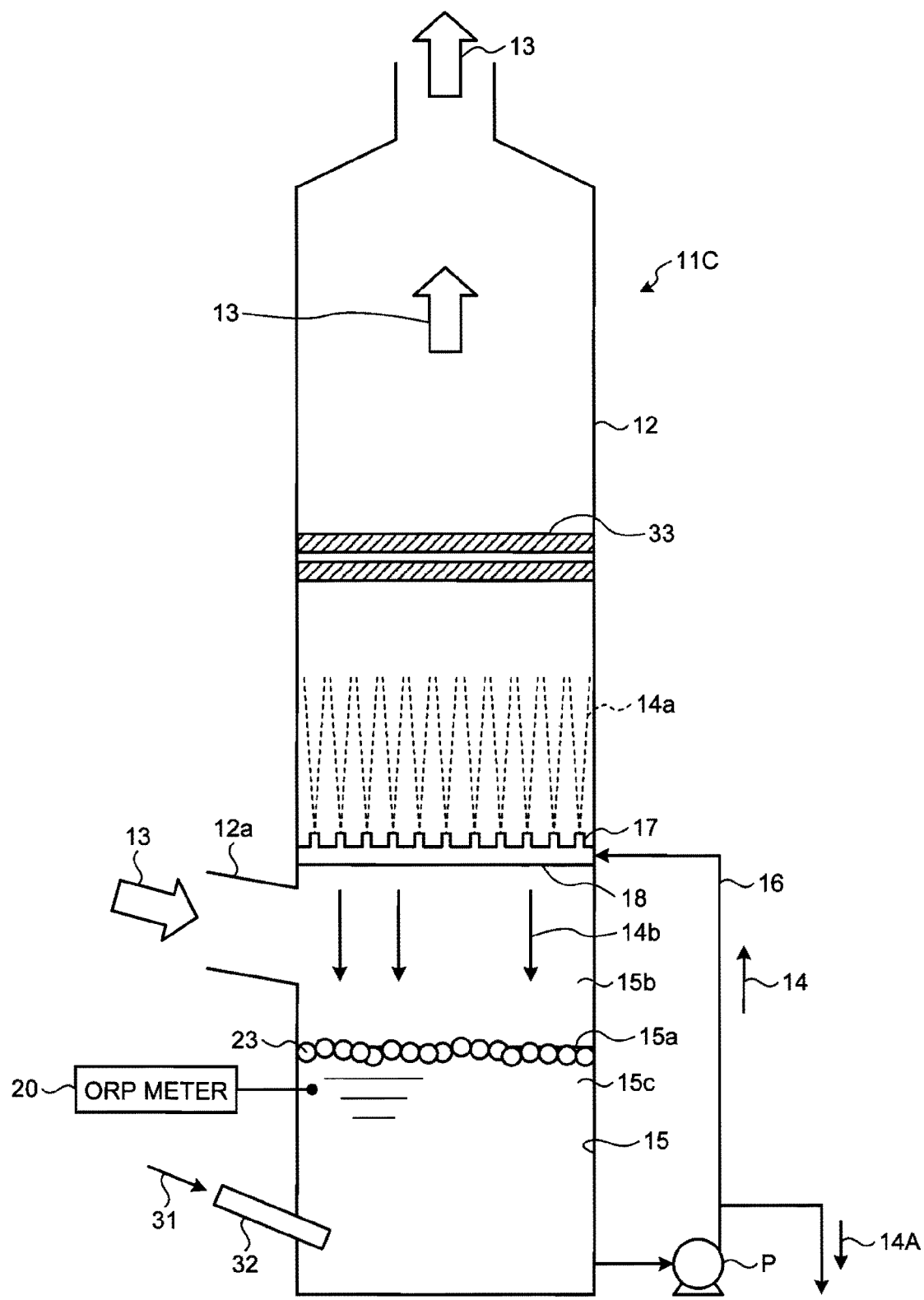
FIG. 3 is an outline drawing illustrating a wet type flue-gas desulfurization apparatus according to a third embodiment.

A wet type flue-gas desulfurization apparatus according to a third embodiment of the present invention is explained below with reference to an accompanying drawing. FIG. 3 is an outline drawing illustrating the wet type flue-gas desulfurization apparatus according to the third embodiment. Herein, the constituent elements identical to the constituent elements described in the first embodiment are referred to by the same reference numerals, and the explanation thereof is not repeated.

As illustrated in FIG. 3, a desulfurization apparatus 11C according to the third embodiment includes falling-liquid cushioning floaters 23, which float on the liquid level 15a, in place of the oxidation resistant pipe group 21 according to the first embodiment.

In the third embodiment, the falling-liquid cushioning floaters 23 are made to float freely on the liquid level 15a in the absorbent accumulating unit 15.

As a result, even in the case when the spray liquid 14a sprayed from the spray nozzle 17 of the spray pipe 18 reverses the course and falls down, the falling-liquid cushioning floaters 23 cushion the shock of the spray liquid 14a directly hitting the liquid level 15a. Hence, there is a reduction in the entrainment of the gas which occurs in the absorbent accumulated in the absorbent accumulating unit due to the waterfall effect in which the falling liquid 14b directly falls down.

Herein, the falling-liquid cushioning floaters 23 are formed to be abrasion-resistant in nature by performing aluminum coating, and have mutually similar shapes that are slightly larger than table tennis balls.

Meanwhile, it is also possible to collect the falling-liquid cushioning floaters 23. In regard to the collection, the falling-liquid cushioning floaters 23 are desirably of such a size that they are not sucked into a pump. Besides, a mesh-like filter can also be fit to the pump suction opening so as to ensure that the falling-liquid cushioning floaters 23 do not flow into the pump.

Fourth Embodiment

Figure 4:
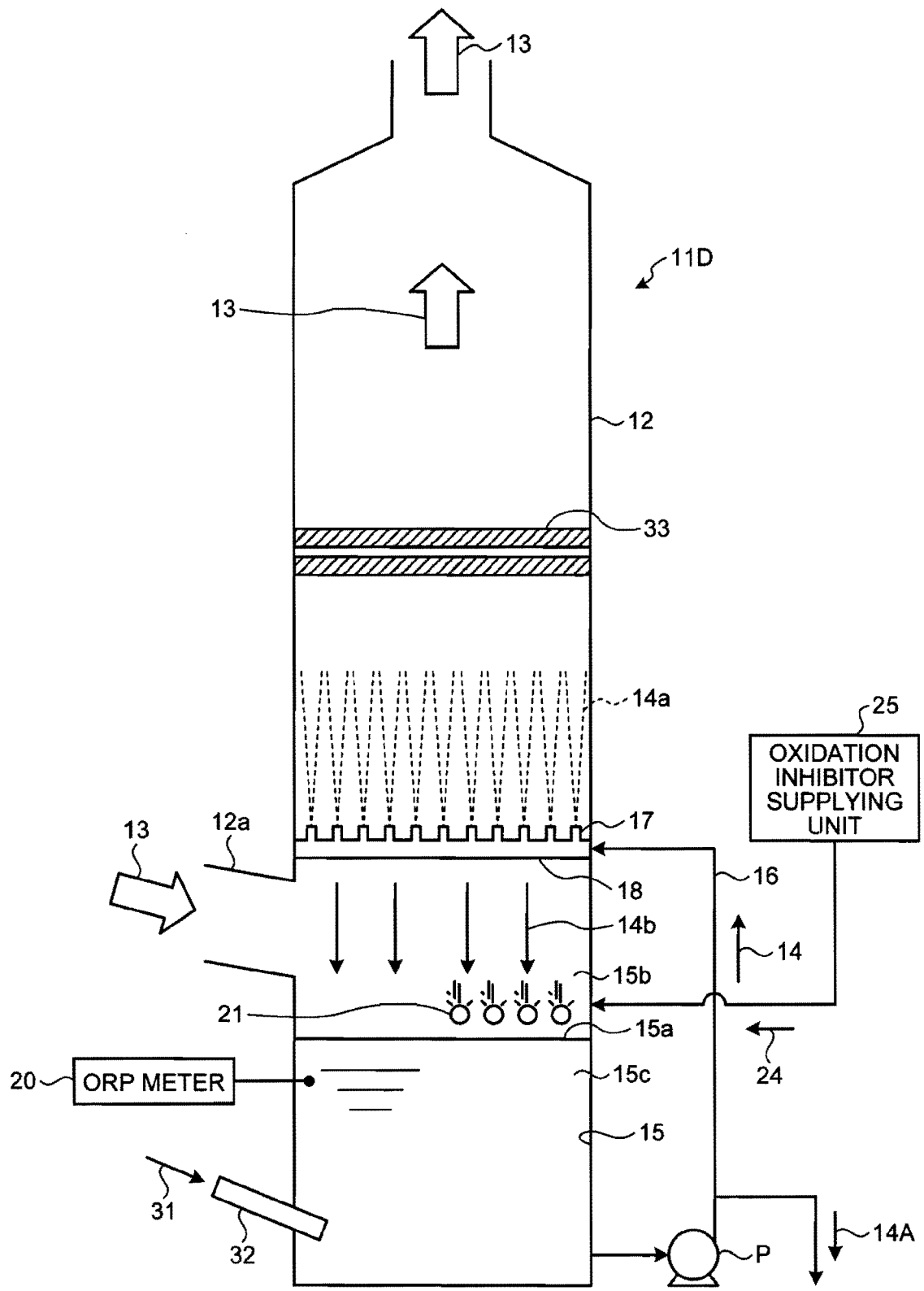
FIG. 4 is an outline drawing illustrating a wet type flue-gas desulfurization apparatus according to a fourth embodiment.

A wet type flue-gas desulfurization apparatus according to a fourth embodiment of the present invention is explained below with reference to an accompanying drawing. FIG. 4 is an outline drawing illustrating the wet type flue-gas desulfurization apparatus according to the fourth embodiment. Herein, the constituent elements identical to the constituent elements described in the first embodiment are referred to by the same reference numerals, and the explanation thereof is not repeated.

As illustrated in FIG. 4, a desulfurization apparatus 11D according to the fourth embodiment includes the oxidation resistant pipe group 21 according to the first embodiment as well as includes an oxidation inhibitor supplying unit 25 that supplies an oxidation inhibitor 24 in the absorbent accumulating unit 15.

As far as the oxidation inhibitor 24 is concerned, it is possible to use either any one of the following components or a mixture of two or more of the following components: a known silicon antifoam agent, a known fat-based antifoam agent, a known fatty acid antifoam agent, a known mineral antifoam agent, a known alcoholic antifoam agent, a known amide antifoam agent, a known phosphoric ester antifoam agent, a known metallic soap antifoam agent, glycerin, iodine, sulfur, thiosulfuric acid, and sulfide.

Fifth Embodiment

Figure 5:
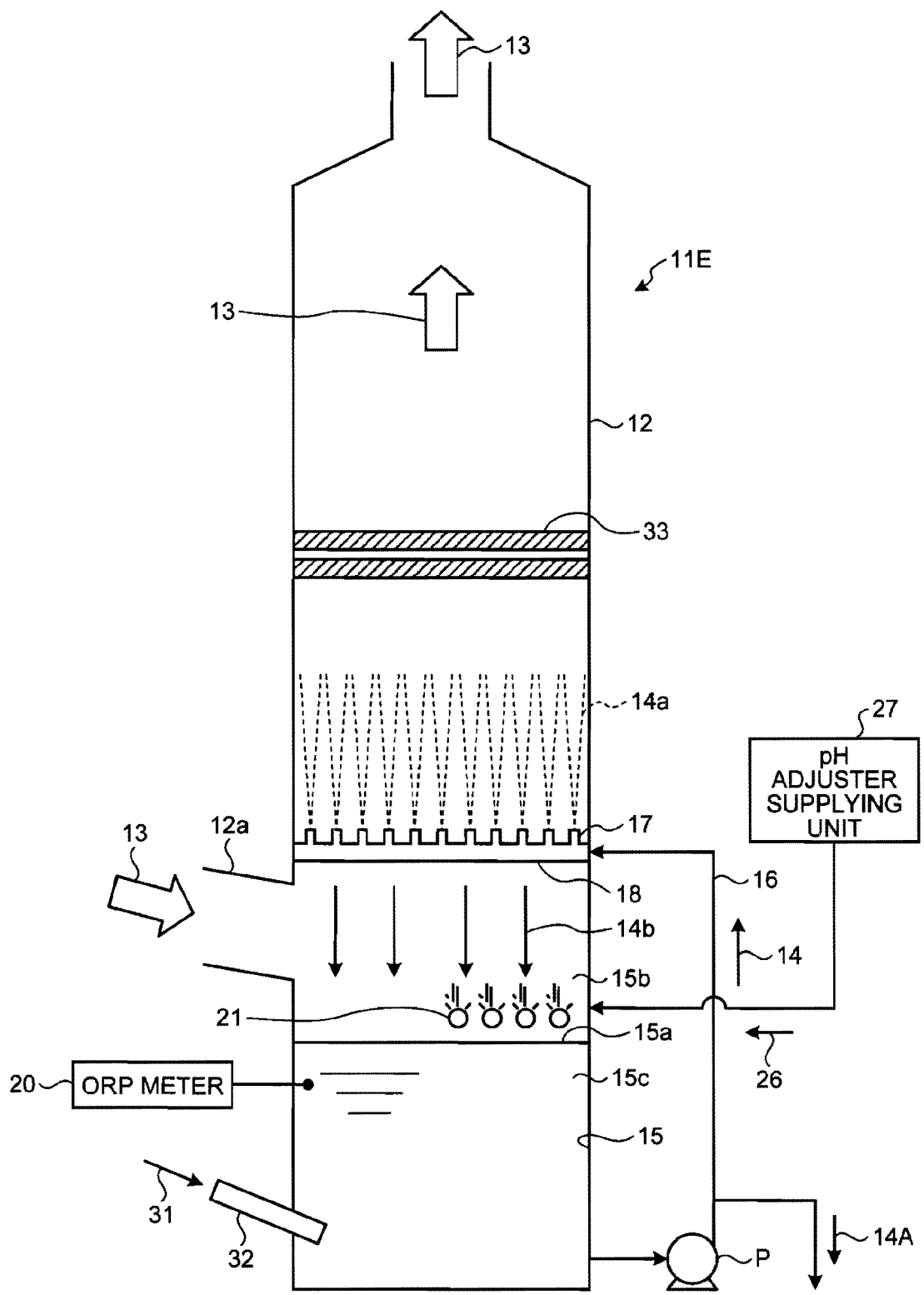
FIG. 5 is an outline drawing illustrating a wet type flue-gas desulfurization apparatus according to a fifth embodiment.

A wet type flue-gas desulfurization apparatus according to a fifth embodiment of the present invention is explained below with reference to an accompanying drawing. FIG. 5 is an outline drawing illustrating the wet type flue-gas desulfurization apparatus according to the fifth embodiment. Herein, the constituent elements identical to the constituent elements described in the first embodiment are referred to by the same reference numerals, and the explanation thereof is not repeated.

As illustrated in FIG. 5, a desulfurization apparatus 11E according to the fifth embodiment includes the oxidation resistant pipe group 21 according to the first embodiment as well as includes a pH adjuster supplying unit 27 that supplies a pH adjuster 26 in the absorbent accumulating unit 15.

As far as the pH adjuster 26 is concerned, it is possible to use, for example, an alkaline agent (NaOH or the like) or the gypsum slurry of a higher concentration used at the time of newly supplying the absorbent 14. Moreover, it is desirable that the pH adjuster 26 is added within a scope which does not affect the desulfurization performance.

In this way, when it is determined that the natural oxidation occurring due to the contact between the flue gas and the absorbent leads to substantial oxidation of the sulfurous acid thereby making the absorbent fall in a peroxidative state and when it is determined that the desired ORP value is not achieved; the wet type flue-gas desulfurization apparatuses 11A to 11C according to the embodiments are used to control the natural oxidation of the absorbent. Moreover, when it is determined that the ORP value of the absorbent is not at the desired level, either the pH adjuster 26 or the oxidation inhibitor 24 or both of them are supplied so as to enable adjustment of the oxidation reduction potential of the absorbent in the wet type flue-gas desulfurization apparatuses.

Meanwhile, in the embodiments described above, it is assumed that a liquid-jet column type spraying unit is used in the desulfurization apparatus for the purpose of spraying the absorbent, which absorbs the sulfur oxide present in the flue gas, and dropping the droplets. However, the present invention is not limited to this case. Alternatively, for example, a spray tower type spraying unit can also be used in which droplets of the absorbent are dropped in the downward direction from a spray nozzle.

What is claimed is:

1. A wet type flue-gas desulfurization apparatus comprising:
    a desulfurization apparatus main body;
    a gas introducing unit that is disposed on a side wall of the desulfurization apparatus main body and that introduces a flue gas;
    an absorbent accumulating unit that accumulates an absorbent which has absorbed the sulfur oxide present in the flue gas;
    a circulation line that circulates the absorbent from the absorbent circulating unit;
    a spraying unit that is disposed in the vicinity of the middle portion of the desulfurization apparatus main body and that sprays the absorbent, which is supplied in the circulation line, as a spray liquid from a nozzle;
    an ORP meter that measures the oxidation reduction potential of the absorbent; and
    a falling-liquid cushioning material that is disposed in the vicinity of the interface of the absorbent present in the absorbent accumulating unit and that cushions a falling liquid falling from an absorber of the absorbent.

2. The wet type flue-gas desulfurization apparatus according to claim 1, further comprising an oxidation inhibitor supplying unit that supplies an oxidation inhibitor to the absorbent or in the absorbent accumulating unit.

3. The wet type flue-gas desulfurization apparatus according to claim 1, further comprising a pH adjuster supplying unit that supplies a pH adjuster to the absorbent or in the absorbent accumulating unit for the purpose of adjusting pH.

4. A method for adjusting the oxidation reduction potential of an absorbent in a wet type flue-gas desulfurization apparatus, wherein
    the wet type flue-gas desulfurization apparatus according to claim 1 is used to control the natural oxidation occurring due to a contact between a flue gas of the absorbent and the absorbent, and, when it is determined that an ORP value of the absorbent is equal to or greater than a desired value, to supply either a pH adjuster or/and the oxidation inhibitor.

5. The wet type flue-gas desulfurization apparatus according to claim 2, further comprising a pH adjuster supplying unit that supplies a pH adjuster to the absorbent or in the absorbent accumulating unit for the purpose of adjusting pH.

6. A method for adjusting the oxidation reduction potential of an absorbent in a wet type flue-gas desulfurization apparatus, wherein
    the wet type flue-gas desulfurization apparatus according to claim 2 is used to control the natural oxidation occurring due to a contact between a flue gas of the absorbent and the absorbent, and, when it is determined that an ORP value of the absorbent is equal to or greater than a desired value, to supply either the pH adjuster or the oxidation inhibitor or both.

7. A method for adjusting the oxidation reduction potential of an absorbent in a wet type flue-gas desulfurization apparatus, wherein
    the wet type flue-gas desulfurization apparatus according to claim 3 is used to control the natural oxidation occurring due to a contact between a flue gas of the absorbent and the absorbent, and, when it is determined that an ORP value of the absorbent is equal to or greater than a desired value, to supply either the pH adjuster or the oxidation inhibitor or both.

* * * * *